J. B. FINLEY.
VEHICLE SHAFT.
APPLICATION FILED OCT. 10, 1910.
1,034,095.
Patented July 30, 1912.
2 SHEETS—SHEET 1.
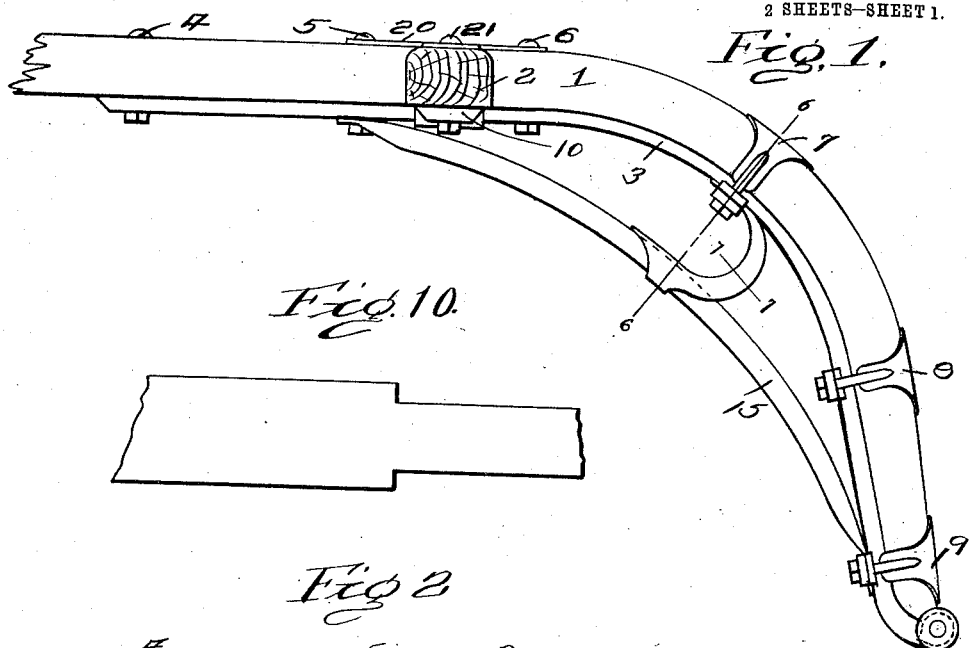
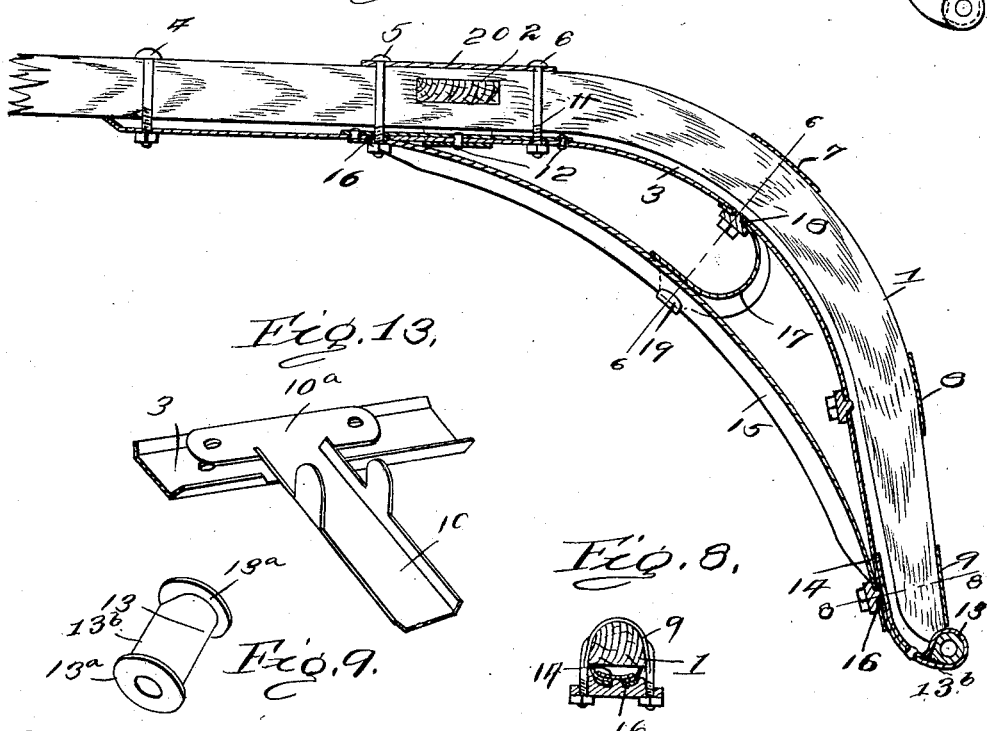

J. B. FINLEY.
VEHICLE SHAFT.
APPLICATION FILED OCT. 10, 1910.
1,034,095.
Patented July 30, 1912.
2 SHEETS—SHEET 2.
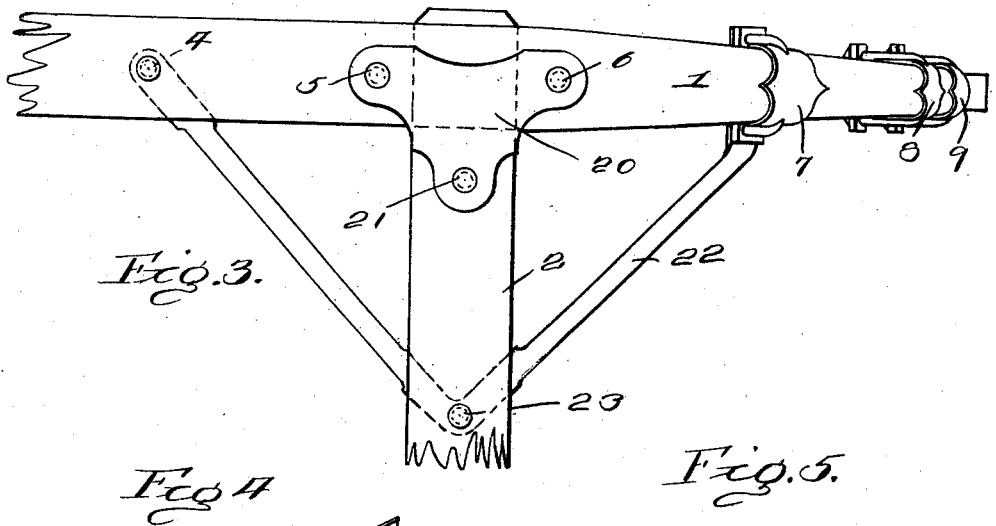
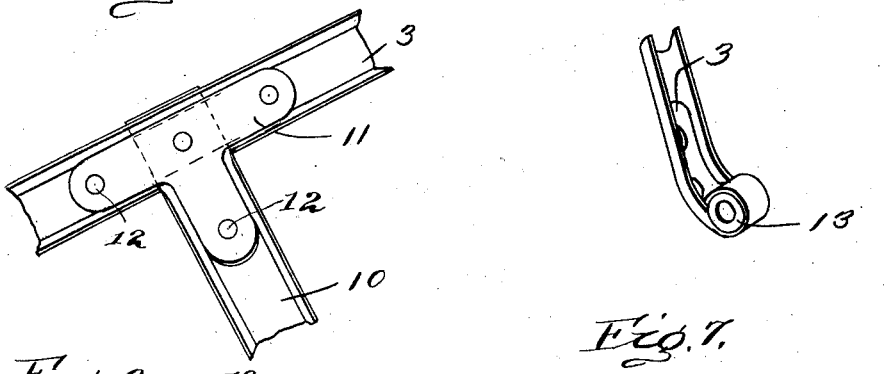
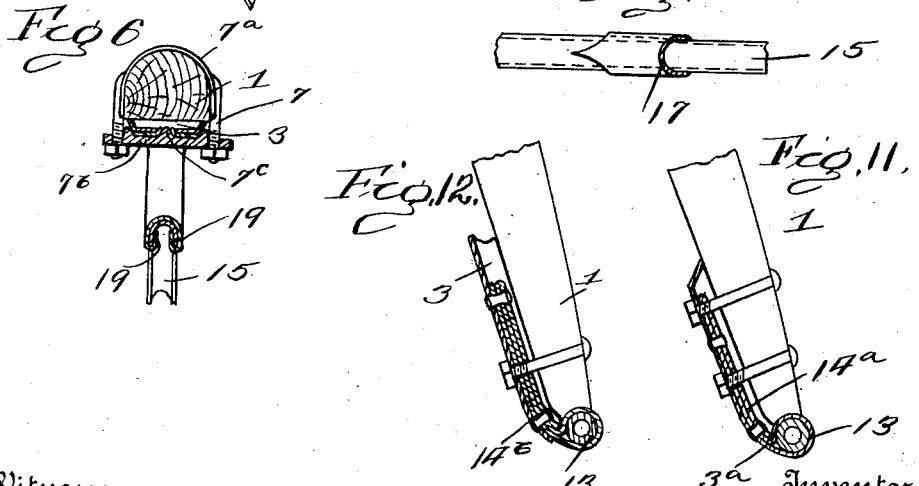
Witnesses
B. G. Rham
S. Jay Teller
Inventor
J. B. Finley
By O. H. Beiss
Attorney

UNITED STATES PATENT OFFICE.

JOHN B. FINLEY, OF PARKERSBURG, WEST VIRGINIA.

VEHICLE-SHAFT.

1,034,095.

Specification of Letters Patent.

Patented July 30, 1912.

Application filed October 10, 1910. Serial No. 586,192.

*To all whom it may concern:*

Be it known that I, JOHN B. FINLEY, a citizen of the United States, residing at Parkersburg, in the county of Wood and State of West Virginia, have invented certain new and useful Improvements in Vehicle-Shafts, of which the following is a specification, reference being had therein to the accompanying drawings.

This invention relates to improvements in vehicle shafts, and more particularly to devices for reinforcing the heel portion of the shafts and attaching the shafts to the vehicle axle.

The objects of my invention are to provide devices of this character which are strong and effective, and, at the same time, simple and susceptible of economical manufacture. The devices embodying my invention may be advantageously formed entirely of rolled sheet metal such as iron or steel. I have entirely avoided the necessity for welds, as I have found that in the practical manufacture of devices of this character, it is very difficult, if not impossible, to economically obtain welds which are reliable and satisfactory.

In the accompanying drawings I have shown that form of my improved construction which I at present deem preferable, but it will be apparent that many changes may be made without departing from the spirit of my invention.

Of the drawings Figure 1 is a side elevation of the heel portion of a shaft taken looking outward, the cross bar being shown in section. Fig. 2 is a view similar to Fig. 1, the parts being shown in longitudinal section. Fig. 3 is a fragmentary plan view. Fig. 4 is a fragmentary detail view showing the means for joining the reinforcing straps at the connection between the shaft and the cross bar. Fig. 5 is a detail view of the eye and adjacent parts. Fig. 6 is a sectional view taken along the line 6—6 of Fig. 1. Fig. 7 is a sectional view taken along the line 7—7 of Fig. 1. Fig. 8 is a sectional view along the line 8—8 of Fig. 2. Fig. 9 is a detail view of the coupling thimble or eye. Fig. 10 is a fragmentary detail view of a blank from which the reinforcing strap may be formed. Fig. 11 is a fragmentary sectional view showing a modified form of the eye and adjacent parts. Fig. 12 is a fragmentary sectional view showing a further modification of the eye and adjacent parts. Fig. 13 is a modified detail.

Referring to the drawings, 1 represents one of the shafts of a vehicle, and 2 represents the cross bar mortised into the shaft in the usual way.

3 is a reinforcing strap extending along the underside of the rear portion of the shaft. This strap may be of rolled sheet metal and is preferably made channel shaped throughout. It will usually be found desirable to vary the cross sectional shape of the strap as indicated in the drawings. For instance the forward and upper part of the strap may be formed with a flat central portion with side parts inclined at an angle of about 45°. The forward end of the strap is also similarly inclined. Its shape is indicated in Fig. 6. At the rear lower end of the shaft, both on account of the decreasing width and correspondingly decreased strength of the shaft, it may be found desirable to make the strap arcuate in cross section as indicated in Fig. 8. In fact the shape should change gradually and uniformly from a point such as that at which the section in Fig. 6 is taken, to a point such as that at which the section in Fig. 8 is taken. It will be understood that the metal strip from which the reinforcing strap is formed is of uniform width throughout except for the extension 14 at the rear end, the purpose of which will be fully set forth hereafter. In Fig. 10, I have shown a blank such as may be used for the formation of the strap 13. The reinforcing strap may be secured to the shaft by any desired means. The means which I have shown in the drawings for the purpose of illustration, comprises bolts 4, 5 and 6 near the forward end of the strap and axle clips 7, 8 and 9 near the rear lower end. These axle clips are similar to each other and it will be sufficient to describe one of them as, for instance, that shown in Fig. 6. It will be noted that this comprises the clip part proper 7$^a$ which is connected to the cross piece 7$^b$ by means of nuts on the ends of the bolts which extend through apertures in the ends of the cross piece. A conical lug 7$^c$ is provided and this extends into and engages with a suitable aperture formed in the strap. As shown in Fig. 6, the lug 7$^c$ may also engage the edges of one of the bosses 16 or 18 of the brace members to secure the brace in place. These brace members with their bosses will be fully described hereinafter.

10 is a channeled strap similar to 3 and similarly provided with inclined edge and end portions. As shown in Fig. 4, the outer end of the strap 10 is extended outward and bent to conform to and engage with the under surface of the strap 3. The inner edge of the strap 3 is at this point bent downward into the main plane of the strap to permit the insertion of a flat T-shaped plate 11 which is held in place by rivets 12, 12. I consider it preferable, if not in fact essential, that the joint be so constructed, by means of dies or otherwise, that the edges of the T-shaped plate 11 will be at all points in firm and rigid engagement with the beveled edges of the straps 3 and 10. This engagement between the T-shaped plate and the strap edges greatly strengthens the joint and serves to relieve the rivets from practically all shearing stress.

The T-joint which I have described is the one which I at present consider preferable though various changes and modifications may readily be made. In Fig. 13, I have indicated another form of construction embodying these features of my invention. Here I have shown the strap 10 as extending through a suitable notch in the inner inclined top of the strap 3 and provided with an integral T-portion 10$^a$ which lies within the channel space of the strap 3. In the drawings however the parts 3 and 10 are shown separated for the sake of clearness. When this form of my invention is used the parts may, if desired, be held in place by the bolts 5 and 6 which may extend through suitable apertures.

It will be obvious that the improved joint which I have described is not necessarily limited to use in the particular construction in connection with which I have described it. It is, for instance, equally well adapted for forming T's to reinforce the connection between a tongue and a circle bar.

The rear end of the strap 3 is preferably bent backward and then bent upward and forward and downward around a sleeve or bushing 13 which may, if desired, be formed of cast iron and provided with side flanges 13$^a$, 13$^a$.

13$^b$ indicates a rib which may be used to prevent the sleeve from turning.

I do not desire to limit myself to a sleeve such as that shown as obviously a simple cylindrical bushing such as a section of piping may be used. The end 14 of the strap 3 is made sufficiently narrow to be carried backward along the main part of the strap within the channeled portion. In this way the eye for attaching the shaft to the vehicle axle is very simply and effectively secured to the shaft. While I have shown the strap parts for securing the eye 13 as integral with the main strap 3, it will be obvious that this construction may be modified to the extent of providing a separate strap for securing the eye. Such a modification is shown in Fig. 11. In this modification I have provided a strap 3$^a$ which engages the bushing 13 in a manner similar to that already described. I have further modified the construction by doubling the strap upon itself a second time, as shown at 14$^a$.

Fig. 12 shows a still further modification in which a separate strap 14$^b$ is provided within the main reinforcing strap 3. After being passed around the bushing 13, this may be again doubled upon itself as in the construction shown in Fig. 11.

15 is a brace extending across the bend of the shaft. In its preferred form this brace is of sheet metal U-shaped in cross section. However, if preferred, a V-shaped section, or one nearly circular, may be used. The ends of the brace are flattened and are provided with bolt or rivet apertures. The metal around each aperture is struck up to form a circular boss 16, and corresponding apertures, or depressions are formed in the strap 3. The bolts 5 and 9 extend through the apertures in the brace and hold it in place. It will be noted that the thrust or tension in the brace at any time is largely or entirely transmitted to the strap 3 by means of the bosses 16, the bolts 5 and 9 being thus relieved from shearing stress.

I prefer to provide a supplementary or cross brace 17 between the center of the main brace 15 and the bend of the shaft. This brace 17 may be formed of rolled sheet metal, and is preferably U-shaped in cross section. The brace as a whole may be made semi-circular, one end being flattened and provided with an apertured boss 18 similar to the bosses 16 of the main brace 15. The clip 7 engages the brace 17, and the boss 18 lies within a suitable depression in the strap 3. The other end of the brace 17 is made to conform to and engage with the outer surface of the brace 15. Ears 19, 19, are provided which are bent over the edges of the brace 15 to rigidly and securely lock the two braces together. In this way a very strong joint is provided without the necessity of welding.

The tops of the shaft and cross bar are preferably connected by a plate such as is indicated at 20, this plate being secured by the bolts 5 and 6 of the shaft, and a bolt 21 passing through the cross bar.

In some cases it is desirable to provide an angle brace between the shaft and the cross bar. In the drawings at 22 I have shown one form of angle brace. This may be constructed of rolled sheet metal and made U-shaped in cross section. The ends are flattened and may be engaged by bolts such as 4 and those securing the clip 7. The center is similarly flattened and apertured to receive the bolt 23 which extends through the cross bar.

What I claim is:—

1. In an article of the class described, the combination with a shaft, of a channel-shaped reinforcing strap of sheet metal connected to the heel portion of the shaft, and an extension at the rear end of the strap looped backward upon itself to encircle an eye, the end of the said projection lying within the channel space of the strap, substantially as set forth.

2. In an article of the class described, the combination with a shaft, of a channel-shaped reinforcing strap of sheet metal connected to the heel portion of the shaft, and a strap element connected to the rear end of the strap and looped forward upon itself to encircle an eye, the end of the said element lying within the channel space of the strap, substantially as set forth.

3. In an article of the class described, the combination with a shaft, of a channel-shaped reinforcing strap connected to the heel portion of the shaft, and a strap element connected to the rear end of the strap and looped forward upon itself to encircle an eye, the end part of the said element being doubled backward upon itself within the channel space of the strap, substantially as set forth.

4. In an article of the class described, the combination with a shaft, of a channel-shaped sheet metal reinforcing strap connected thereto, the said strap having at its rear end an extension bent into cylindrical form with its end within the channel part of the strap, and a bushing encircled by the said cylindrical part of the extension, substantially as set forth.

5. In an article of the class described, the combination with a shaft, of a reinforcing strap connected thereto, the strap comprising a channel shaped strip of sheet metal, flat with inclined side parts near its forward end and partly cylindrical in cross section near its rear end, substantially as set forth.

6. In an article of the class described, the combination of a shaft, and a reinforcing strap connected thereto and comprising a strip of sheet metal flat with inclined sides near its forward end and partly cylindrical in cross section near its rear end, the said strap having an extension at its rear end which is looped into substantially cylindrical shape with its end within the partly cylindrical section of the strap, substantially as set forth.

7. In an article of the class described, the combination with a shaft, of a reinforcing strap connected thereto and comprising a strip of metal flat with inclined sides near its forward end and partly cylindrical in cross section near its rear end, a bearing bushing, and an extension at the rear end of the strap encircling the bushing, the end of the extension lying within the partly cylindrical section of the strap, substantially as set forth.

8. In a vehicle shaft, a thill coupling comprising a channel-shaped strip of sheet metal connected to the shaft and having its edges in engagement therewith, the rear part of the strip being bent into substantially cylindrical form to encircle an eye, and the end lying within the channeled part of the strip, substantially as set forth.

9. In a vehicle shaft, a thill coupling comprising a strap connected to the shaft and doubled upon itself to form an eye, the outer part of the doubled strap being provided with lateral flanges inclined toward the shaft, substantially as set forth.

10. In a vehicle shaft, a thill coupling comprising a strap connected to the shaft and doubled upon itself to form an eye, and inclined elements to cover the edge of the strap part which is adjacent the shaft, substantially as set forth.

11. In a vehicle shaft, a thill coupling comprising a channel-shaped strip of metal having its edges in engagement with the shaft, an extension at the lower rear end of the strip bent into substantially cylindrical form, its end lying within the channel space of the strip and parallel thereto, a bushing encircled by the said extension, a connection between the two parallel parts of the strip, and means for connecting the coupling to the shaft, substantially as set forth.

12. In a vehicle shaft, a thill coupling comprising a channel-shaped strip of metal having its edges in engagement with the shaft, an extension at the rear lower end of the said strip bent into substantially cylindrical shape and carried forward within the channel space of the strip and then again doubled upon itself and carried backward within the said channel space, means for connecting together the three parallel parts of the strip, and means for connecting the coupling to the shaft, substantially as set forth.

13. In a vehicle shaft, a thill coupling comprising a strip of metal, a bushing about which the strip of metal is doubled upon itself, the two end parts of the strip being in contact at the same side of the shaft, and means for securing the two contacting strip parts to the shaft, substantially as set forth.

14. In an article of the class described, the combination of a shaft, a reinforcing strap at the under side of the heel portion thereof, and a brace across the heel portion comprising a channel-shaped strip of sheet metal, substantially as set forth.

15. In an article of the class described, the combination with a shaft, of a reinforcing strap at the under side of the heel portion thereof comprising a channel-shaped strip of sheet metal provided at opposite sides of the curve of the shaft with depressions, a brace across the curve of the shaft, the said brace being of sheet metal and having bosses adapted to enter and engage with the said depressions, and means for securing the brace in place, substantially as set forth.

16. In an article of the class described, the combination with a shaft, of a brace across the heel portion thereof, comprising a channel-shaped strip of sheet metal, substantially as set forth.

17. In an article of the class described, the combination with a shaft, of a main brace across the heel portion thereof, comprising a channel-shaped strip of sheet metal, and a cross brace between the main brace and the curve of the shaft, comprising a strip of sheet metal provided with ears bent over the edges of the main brace, substantially as set forth.

18. In an article of the class described, the combination of a main brace across the heel portion thereof comprising a strip of sheet metal, and a cross brace comprising a strip of sheet metal connected at one end to the curve of the shaft and interlocked at the other with the main brace, substantially as set forth.

19. In an article of the class described, the combination with a shaft, of a main brace across the heel portion of the shaft, comprising a U-shaped strip of metal, and a cross brace between the main brace and the curve of the shaft comprising a semi-cylindrical strip of sheet metal bent U-shape in cross section and provided with ears bent over and engaging with the edges of the main brace, substantially as set forth.

20. In an article of the class described, the combination with a shaft and a cross bar, of channel-shaped reinforcing straps connected to each, the strap of the cross bar being flattened and bent into shape to engage with the outer side of the shaft strap, a T-shaped plate adapted to lie within the channel space of the two straps and to firmly engage the channel edges thereof, and means for connecting the said plate with the straps, substantially as set forth.

21. In an article of the class described, the combination of two bar elements connected at substantially right angles to one another, channel-shaped reinforcing straps secured to each of the said elements, a T-plate within the channel spaces of the two straps at the joint and firmly engaging with the channel edges, and means for securing the plate to each of the said straps, substantially as set forth.

22. In an article of the class described, the combination of two bar elements connected at substantially right angles to one another, channel shaped reinforcing straps secured to each of said elements, and a T-shaped member rigidly connected with one of the channel shaped straps and having its T-arms secured within the channel space of the other channel shaped strap, substantially as set forth.

23. In an article of the class described, the combination of a shaft and a cross bar, of a continuous angle brace connecting the cross bar with the shaft at two points, the said brace consisting of rolled sheet metal channel shaped in cross section and flattened to engage the shaft and cross bar, substantially as set forth.

24. In an article of the class described, the combination with a shaft having a bent rear end, of a channel shaped reinforcing strap adjacent the underside of the said bent rear end, the said strap being provided with an aperture, a sheet metal brace extending across the bend of the shaft and having an apertured boss extending into the said aperture of the strap and means for securing the brace and the strap to the shaft comprising a cross piece having a lug adapted to enter the aperture of the said boss and a device for securing the cross piece in position relative to the shaft, substantially as set forth.

25. In an article of the class described, the combination of a shaft, a substantially cylindrical coupling bushing provided at its ends with parallel annular flanges and a reinforcing strap for the shaft having a rear extension encircling the bushing between the said flanges to secure the bushing in place, substantially as set forth.

26. In an article of the class described, the combination with a shaft, of a coupling bushing provided with parallel annular flanges at its ends, a reinforcing strap for the shaft provided with an extension at its rear end which encircles the said bushing between the flanges, and positive means for preventing rotation of the bushing relative to the strap, substantially as set forth.

27. The combination with a vehicle shaft having a bent end with rearward and backward diminishing cross sectional area of a reinforcing strap initially uniform in width and arched to have backward and downward increasing strength in flexure, substantially as set forth.

In testimony whereof I affix my signature, in presence of two witnesses.

JOHN B. FINLEY.

Witnesses:
N. CURTIS LAMMOND,
S. JAY TELLER.

Copies of this patent may be obtained for five cents each, by addressing the "Commissioner of Patents, Washington, D. C."